United States Patent
Garibotto et al.

[11] Patent Number: 5,911,767
[45] Date of Patent: Jun. 15, 1999

[54] NAVIGATION SYSTEM FOR AN AUTONOMOUS MOBILE ROBOT

[76] Inventors: Giovanni Garibotto, Via don Paseri, Varazze (Savona); Marco Ilic, Via Secchi, Reggio Emilia; Stefano Masciangelo, Via Donaver 20/25, Genova, all of Italy

[21] Appl. No.: 08/537,390

[22] Filed: Oct. 2, 1995

[30] Foreign Application Priority Data

Oct. 4, 1994 [IT] Italy .................................. MI94A2020

[51] Int. Cl.$^6$ ............................. G05D 1/02; G01B 11/10; G06F 165/00
[52] U.S. Cl. ................................ 701/28; 701/25; 348/119
[58] Field of Search ..................... 364/424.027, 424.033, 364/460, 424.029; 318/587; 348/118, 119; 180/167, 168, 169; 382/103, 104, 106

[56] References Cited

U.S. PATENT DOCUMENTS

| | | | |
|---|---|---|---|
| 3,553,438 | 1/1971 | Blitz et al. ........................... | 235/61.11 |
| 4,278,142 | 7/1981 | Kono ..................................... | 180/168 |
| 4,566,032 | 1/1986 | Hirooka et al. ......................... | 358/103 |
| 4,727,471 | 2/1988 | Driels et al. ............................ | 364/167 |
| 4,862,047 | 8/1989 | Suzuki et al. ........................... | 318/587 |
| 5,041,722 | 8/1991 | Suzuki et al. ........................... | 250/202 |
| 5,051,906 | 9/1991 | Evans, Jr. et al. ................. | 364/424.02 |
| 5,155,684 | 10/1992 | Burke et al. ....................... | 364/424.02 |
| 5,260,556 | 11/1993 | Lake et al. ............................... | 235/494 |
| 5,296,924 | 3/1994 | De Saint Blancard et al. ........ | 348/118 |
| 5,525,883 | 6/1996 | Avitzuor ................................... | 318/587 |

FOREIGN PATENT DOCUMENTS

| | | |
|---|---|---|
| 0364353 | 4/1990 | European Pat. Off. . |
| 2259823 | 3/1993 | United Kingdom . |
| 9315376 | 8/1993 | WIPO . |

OTHER PUBLICATIONS

Proceedings of the IECON'93, International Conference on Industrial Electronics, Control and Instrumentation, vol. 13, Nov. 15, 1993, pp. 1466–1471.

Electronics Letters, vol. 24, No. 21, Oct. 13, 1988, pp. 1326–1327, Robot Guidance Using Standard Mark.

Stanlet Grossman, *Calculus—Third Edition*, Copyright 1984, Academic Press, Inc., p. 579.

*Primary Examiner*—Michael Zanelli
*Attorney, Agent, or Firm*—Hedman, Gibson & Costigan, P.C.

[57] ABSTRACT

A navigation system for an autonomous mobile robot within an environment which comprises coded signs at predetermined points comprising means for storing data regarding said environment, including data regarding the positions of said coded signs relative to the environment, passive vision systems for the image acquisition and automatic recognition of said coded signs, a computer for estimating its own position and orientation relative to one of said coded signs and to the environment, means for acquiring the location of target positions, means for planning a path to be covered within said environment to reach target positions, and means for controlling the robot motion based on the stored path data.

12 Claims, 9 Drawing Sheets

NAVIGATION SYSTEM FOR AN AUTONOMOUS MOBILE ROBOT

BACKGROUND OF THE INVENTION

This invention relates to a navigation system for mobile robots. Robot guidance systems are implemented in many different forms. During its motion within an environment, the robot is set to move along predetermined paths. The robot verifies its own position along the path being taken by making odometric measurements. This means that sensors positioned at the locomotion means, i.e. the wheels, compute the distance travelled by the robot and any angular variations in orientation which may occur in its trajectory. Helping itself with this type of measurement, the robot is able to follow any type of trajectory. However, actually, the slack between moving mechanical parts, which cannot be calculated beforehand, slippage along the ground, ground roughness and other imperfections mean that discordance exist between the position calculated at a determined instant from the odometric measurements, and the position effectively reached at that moment by the robot. These evaluation errors incrementally add during the movement of the robot, which can hence at the end of its predetermined path be in a position totally different from that required.

It is therefore necessary to provide the robot with an autonomous system for monitoring its position within an environment, which whenever the odometrically estimated position is different form the effective position causes the odometric measurements to be updated to their correct values. This provides a cyclic check on the real position of the robot, together with a trajectory correction if a significant error is found. Hence the danger of the robot being in an erroneous position at the conclusion of its path is minimized.

In the past, different ways of making such a check have been proposed. One widely practised method is to insert into the environment or environments within which the robot is supposed to operate, both active and passive sensors located in predetermined positions known to the robot. Active sensors can be for example active beacons emitting coded signals. A passive sensor is located on the robot to sense the signals emitted by several beacons such that the robot navigation system can deduce its own position relative to them. The beacons are often coupled with RF (radiofrequency) emitters in order to transmit the position code associated with the beacon to the robot.

Other systems use energy emitting sensors located on board the robot, for example rotary laser scanners coupled with a photodiode. For this purpose a number of retroreflectors are positioned within the environment to reflect the signal originating from the rotary emitter.

The robot navigation system then calculates the robot position by suitable triangulation.

These known systems exhibit drawbacks and problems.

Firstly, as the number of active sensor or reflecting objects required for calculating the robot position is greater than or equal to three, the number of said sensors must be very large, so that at every reached position in the environment, the robot is able to simultaneously "see" at least three of said sensors or reflecting objects. If the environment is of relatively complex structure, the number of such sensors can become very large. This system is therefore particularly invasive of the integrity of the operational region.

In addition, if a laser is used, its introduction into a working environment causes safety problems if the emitted power exceeds determined levels. Consequently, is the emitted power has to be low, the useful operating distance becomes low as well, with loss of effectiveness. The object of the present invention is to develop a navigation system by which the position of the robot within the environment can be estimated in an unambiguous and simple manner, without finding the aforesaid problems.

SUMMARY OF THE INVENTION

Figure 8:
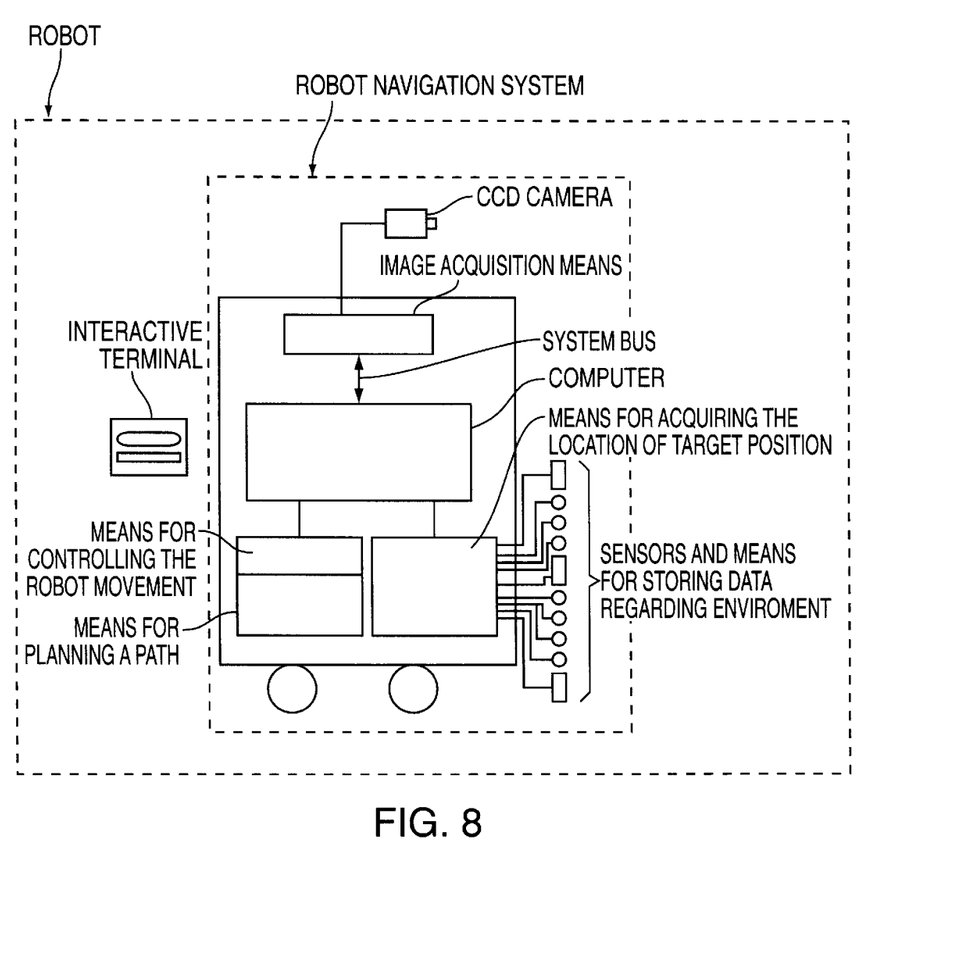
FIG. 8 diagrams the structural elements of the autonomous robot of the invention.
Figures 9, 9A:
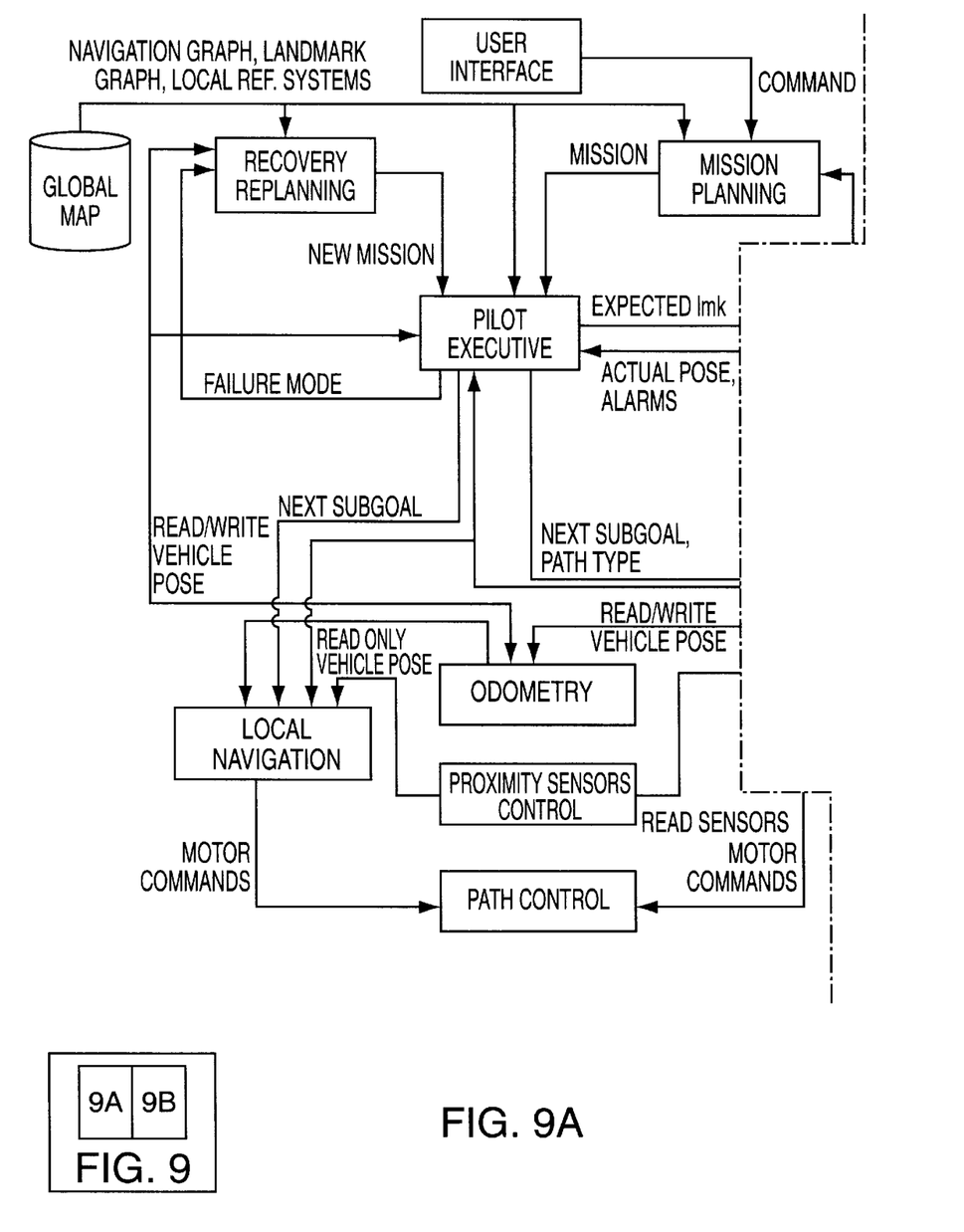
FIG. 9 is a block diagram of the navigation system of the invention.
Figure 9B:
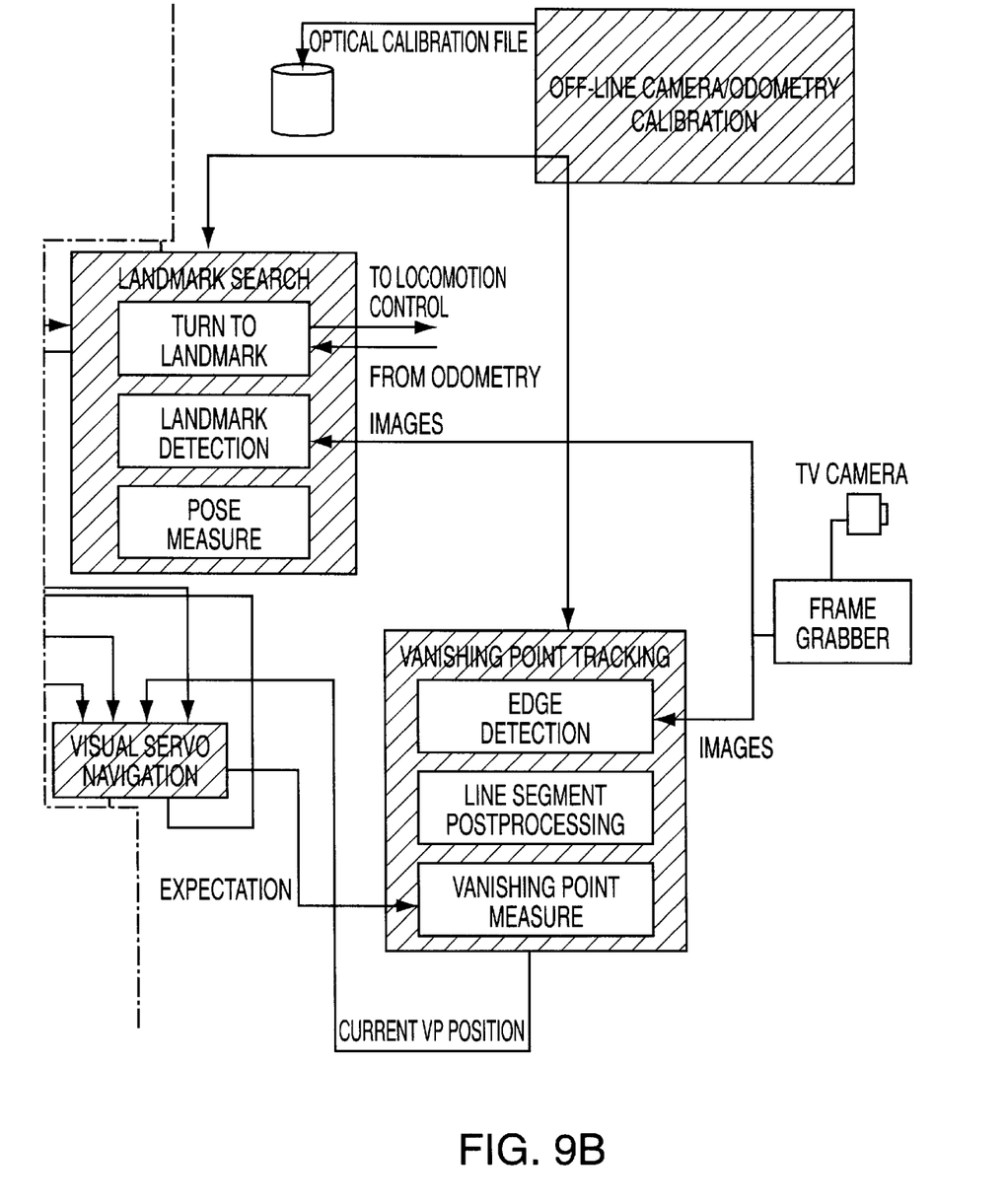

The present invention therefore provides a navigation system for an autonomous mobile robot within an environment which comprises coded signs at predetermined points, said system comprising means for storing data regarding said environment, including data regarding the positions of said coded signs within the environment, means for the image acquisition and automatic recognition of said coded signs, a computer for estimating its own position and orientation relative to one of said coded signs and to the environment, means for acquiring the location of target positions, means for planning a path to be covered within said environment to reach target positions, and means for controlling the robot movement starting with said path data, characterised in that said acquisition means are based on a passive vision system with standard CCD cameras without requiring any particular illumination as shown in FIG 8.

Figure 10:
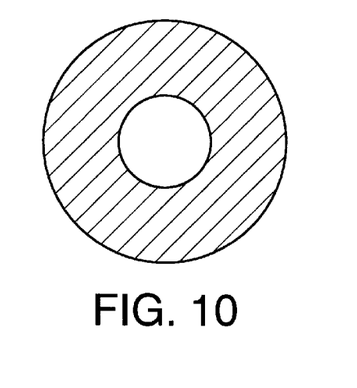
FIG. 10 is an example of the coded sign of the invention.
Figure 11:
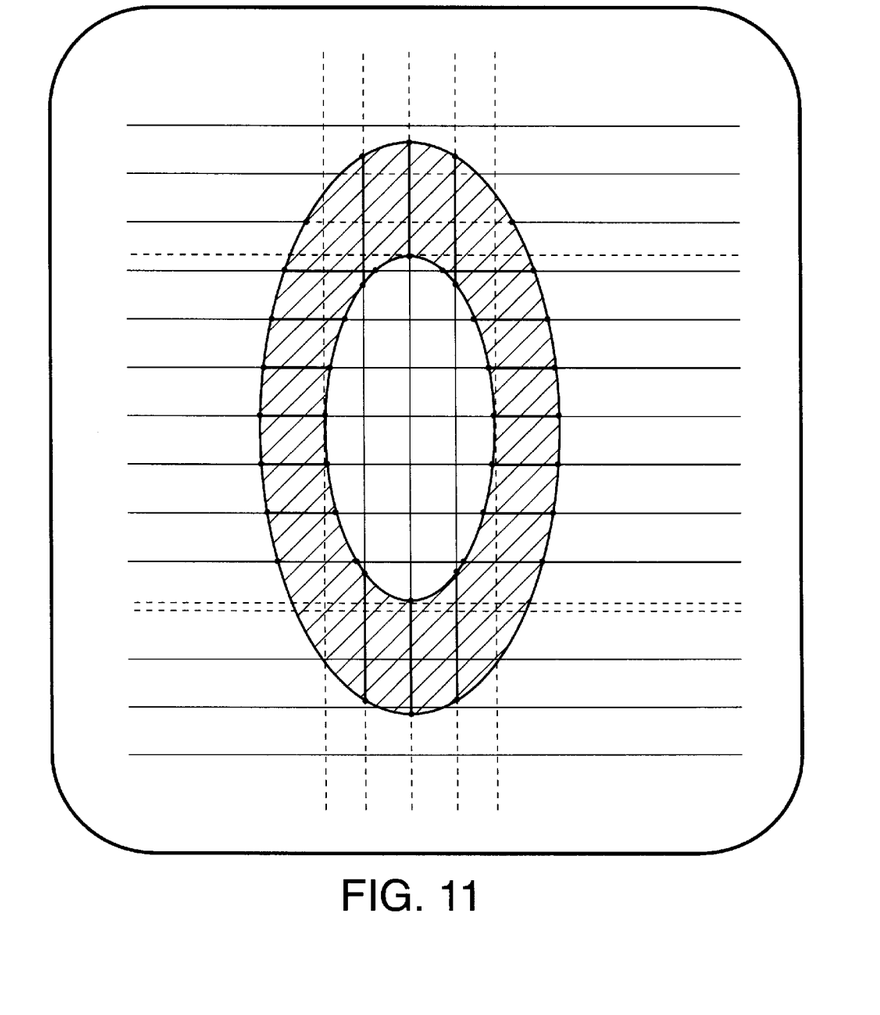
FIG. 11 is an example of the image ellipse of the coded sign of FIG. 10.

Said coded signs are generally called landmarks and are geometric entities, drawn on paper or cardboard fixed to the wall or ground, and may have different geometrical shape according to operative constraints. In particular, advantageously, a landmark is adopted, which is composed of two concentric circles, of which the respective diameter is a fundamental characteristic. To increase the contrast and visibility to the passive visual system, the central region is white whereas the circular ring between the two circles is of a dark colour, in particular black as shown in FIG 10. The advantages of using such landmarks are various and considerable. Firstly, there is a closed mathematical procedure enabling the spatial position and orientation of a circle to be calculated (knowing its radius) starting with the equation of the ellipse represented by its projection onto the image plane. A double circle, or a high-contrast circular ring, generates a very characteristic image which is difficult to confuse with pictorial structures within the environment. Finally, compared with other point configurations usable as landmarks, a circle causes no correspondence problems, in that all the points in its image ellipse can be used indifferently to estimate its equation.

To make it possible to distinguish between several different signs having the same geometric shape configurations, the ratio of the two diameters is varied while maintaining the diameter of the outer circle constant. In this way, a distinctive feature of each sign is given by its ratio.

These landmarks are easily distinguishable from each other based on the different diameter of the inner circle, but in particular they are easily distinguishable from any object which may be located within the environment. This is essential to set the robot in a condition whereby any confusion and error is avoided. A robot should not confuse a different object for a landmark. Such landmarks are easy to construct, and because of their shape, there are no vertical or horizontal axes along which they have to be oriented. Preferably the passive vision system is composed of a camera mounted on the body of the robot, said camera being very preferably a black/white CCD camera, which generates a standard CCIR video signal.

The image acquisition means further comprise a microcomputer, a system memory, a system bus with communication devices, and an image acquisition card connected to the microcomputer via the system bus, said card sampling a black/white standard CCIR video signal and storing it in a memory bank in the form of an image matrix.

The invention provides a robot provided with a navigation system as described herein, for which an installation procedure is provided consisting of the following steps:

a) calibration of the robot/camera system;

b) acquisition and relative storage of data regarding the environment within which the path is to be covered;

after which, when positioned in proximity to a coded sign, c) the user provides the robot with the target position to be reached, or the end-of-mission command;

d) the robot plans the path to be taken starting from the target position to be reached and the data regarding the environment by dividing the path into successive points to be reached;

e) moving the robot by said movement control means to the next point of the planned path;

f) framing a coded sign by said passive vision system;

g) recognition of the coded sign;

h) estimation of the robot's position and orientation relative to said coded sign;

i) calculating the robot's position and orientation relative to the environment starting with the position and orientation relative to the coded sign;

j) controlled movement by said movement control means to the next point on the planned path starting from the position calculated under point i;

k) repetition of points e, f, g, h, i and j until completion of the planned points on the path;

j) repetition of point c, until issuance of an end-of-mission command.

In particular, the calibration procedure may be summarized as comprising the following steps:

an initial image acquisition by framing from various positions a known regular rectangular planer lattice formed from a plurality of rows and columns of regular geometric shapes, which are dark identical dots on a light background, storing the robot position and orientation estimated by an automatic system within an invariant reference system, measuring the positions of the centres of the figures visible in data images, processing said positions and said robot position and orientation to find free parameters of an image formation model.

BRIEF DESCRIPTION OF THE DRAWINGS

Further advantages, aspects and characteristics of the present invention will be more apparent from the description given hereinafter by way of example only. It is based on the accompanying figures, in which.

DETAILED DESCRIPTION OF THE INVENTION

The navigation system according to the present invention must be fed with information concerning the configuration of the environment or environments within which the robot is supposed to operate.

This is done by inserting a map known as a global map containing the following data:

graph of reference systems graph of navigation points list of landmarks.

These data are processed offline during the installation phase preceding the effective use of the robot. The reference system graph describes the clockwise Cartesian reference system on the navigation plan (floor) and the coordinate transformations between them. Each reference system is represented by a vertex on the graph whereas the transformation of coordinates from one system to another is represented by an arch oriented from the vertex associated with the first system to that associated with the second and having as attributes the origin and orientation of the first reference system expressed within the second reference system.

Figure 1:
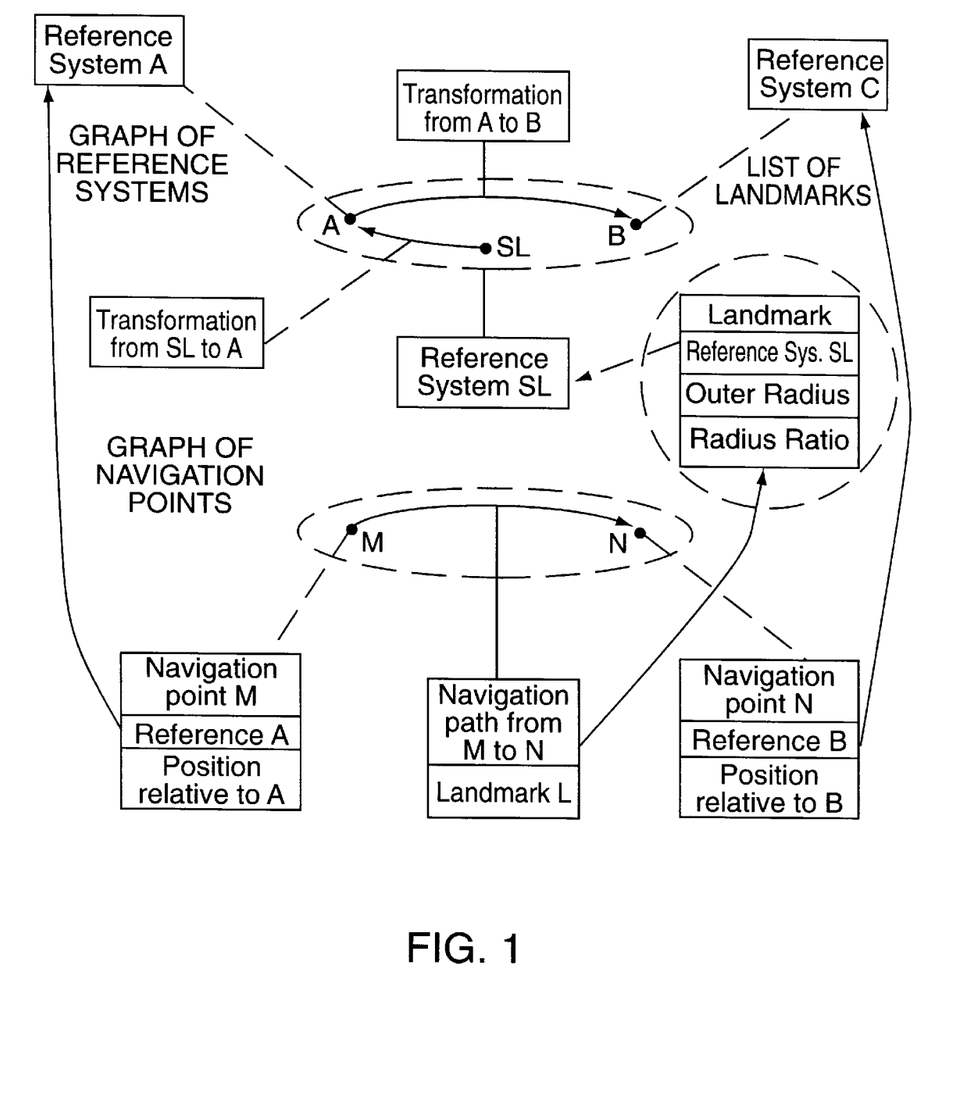
FIG. 1 is a schematic representation of a global map suitable for the present invention.

FIG. 1 describes the contents of a global map, in particular the graphs of the reference systems and navigation points.

Figure 2:
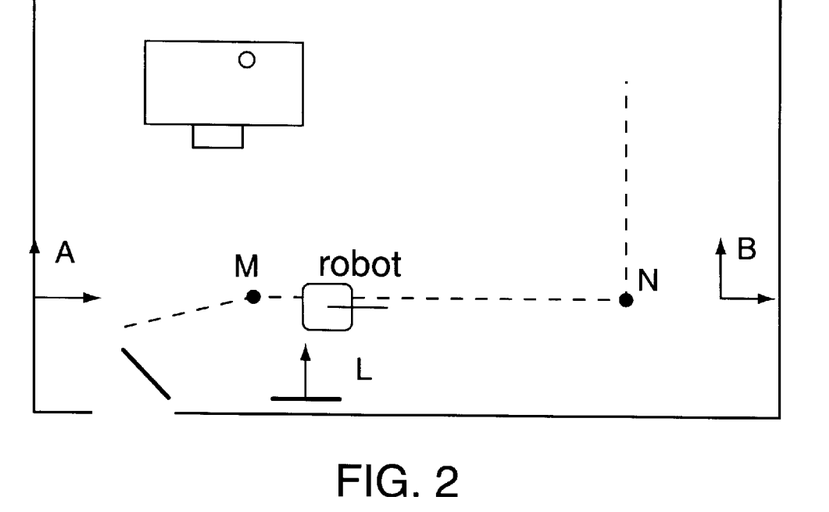
FIG. 2 represents a physical map of an environment within which an autonomous robot moving in accordance with the navigation system of the present invention can be used.

The list of landmarks contains all the landmarks usable for navigation. For each of them, the associated reference system, the measurement of the circle diameter (i.e. of the outer concentric figure) and the ratio of the characteristic corresponding measurements of the two concentric geometric figures are reported. As already stated, this ratio must be such as to unambiguously identify the landmark. By convention, the reference system associated with the landmark finds its origin in the projection of the landmark centre onto the navigation plane and its y axis corresponding to the straight line normal to the landmark plane, the positive direction being that emerging from the visible side. The navigation point graph contains those points in the navigation plane to which the robot vehicle can go and the straight lines between them along which it can travel. Each navigation point is represented on the graph by a vertex having as attributes the associated reference system and the point position expressed in the associated reference system. FIG. 2 shows a physical map to be associated with a global map such as that of FIG. 1.

In the movement of a robot within an environment, the so-called mission is of considerable importance. A mission is a sequence of goals, which the robot vehicle has to reach. Each goal is achieved by executing a list of primitive perceptive of motory actions, known as a task. The robot, by means of its control system, translates into effective action the sequential linking of such tasks, which constitute the given mission.

The implementation of a path or mission, starting from its starting point, comprises essentially the following steps:

1—the robot is made to move along the navigation point graph to the next navigation point;
2—by odometric measurements the robot evaluates its position and stops when the predetermined navigation point is presumed to have been reached;
3—at this point the robot attempts to frame a landmark positioned in proximity to the reached navigation point;
4—having framed the landmark and recognized it from the landmark list available to the robot, it estimates its position and orientation relative to it and on the basis of this information updates its position and orientation within the known global map;
5—the robot repeats steps 1 to 4 for the next navigation point, until it has completed its mission.

The essential point of the present invention is the method of framing and recognizing the landmark and of estimating the position and orientation of the robot relative to the landmark. Of fundamental importance is therefore the ability of the camera to build up an image and to obtain geometric information therefrom.

Figure 4:
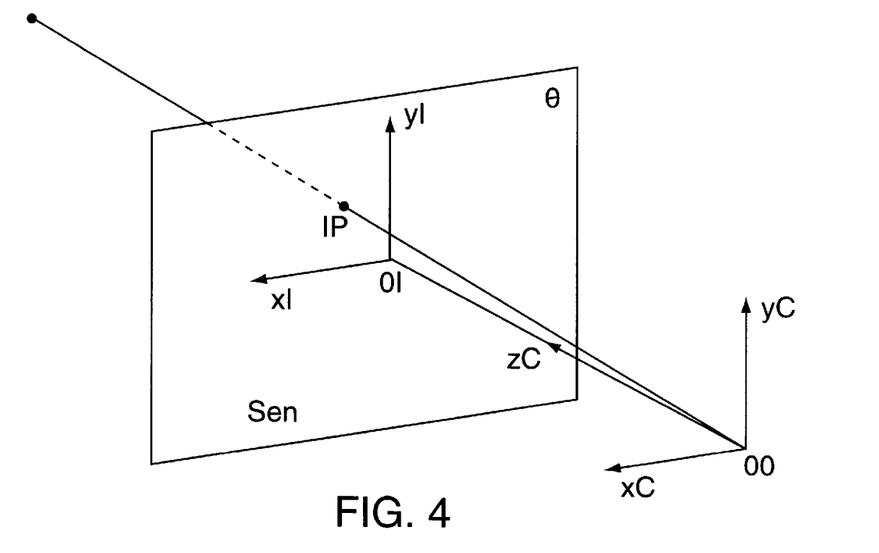
FIG. 4 shows the relationship between the image plane of the camera and its optical centre according to the present invention.

For a given framed scene, the vision system (composed of the camera and acquisition card) provides as output a bidimensional spatial representation known as the image matrix, or merely the image, in the form of a rectangular matrix of positive values. It is formed by using inside the camera a sensor divided into a rectangular grid of photosensitive cells, for each of which the incident light intensity is measured. With each of these cells there corresponds a different element of the image matrix, known as a pixel, the value of which, known as the grey level, is proportional to the light intensity incident on the corresponding cell. The CCD sensor is a rectangular matrix of photosensitive cells mapped onto a corresponding pixel "image" matrix obtained by analog/digital sampling of the camera output analog signal. To describe the geometric model which relates a generic point within the scene to its corresponding pixel within the image its is firstly necessary to define as the image plane that plane within space which contains the telecamera sensor. As can be seen from FIG. 4, the image of a generic scene point P on the sensor is the point IP intersected on the image plane SEN by the straight line joining said point P to a fixed point OC known as the optical centre or pinhole. The optical centre is approximately at the centre of the camera lens system. As the position of the optical centre OC relative to the image plane SEN does not depend either on the orientation of the camera or its position, the image centre OI can be defined as the perpendicular projection of the optical centre OC on the image plane SEN. The distance between the optical centre OC and the image centre OI is known as the focal length, and the straight line joining said two points is known as the optical axis. An image formation model of this type is known as a pinhole camera model. The coordinates xI(IP) and yI(IP) of the image point IP expressed as units of focal length within the reference system centered on the image centre OI are obtained from the coordinates xC(P) and yC(P) of the point P within the reference system centered on OC as:

$$xI(IP) = \frac{xC(P)}{zC(P)};$$

$$yI(IP) = \frac{yC(P)}{zC(P)}$$

Figure 5:
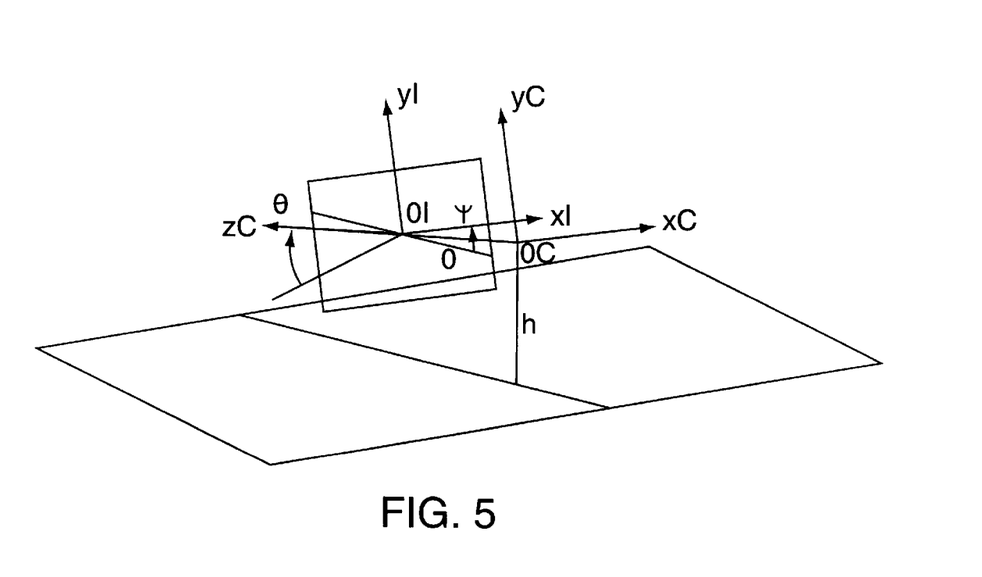
FIG. 5 shows the relationship between the camera calibration plane and the camera orientation according to the present invention.

As can be seen from FIG. 5, the orientation of the camera relative to the horizontal navigation plane is defined by two angles: the tilt angle $\theta$ indicates the inclination of the optical axis zC to the navigation plane; the swing angle $\psi$ indicates the rotation between any straight line parallel to the horizontal line and the horizontal axis xC of the camera. The position of the camera relative to the navigation plane is specified by the height h in millimetres of the optical centre OC above the navigation plane.

Figure 6:
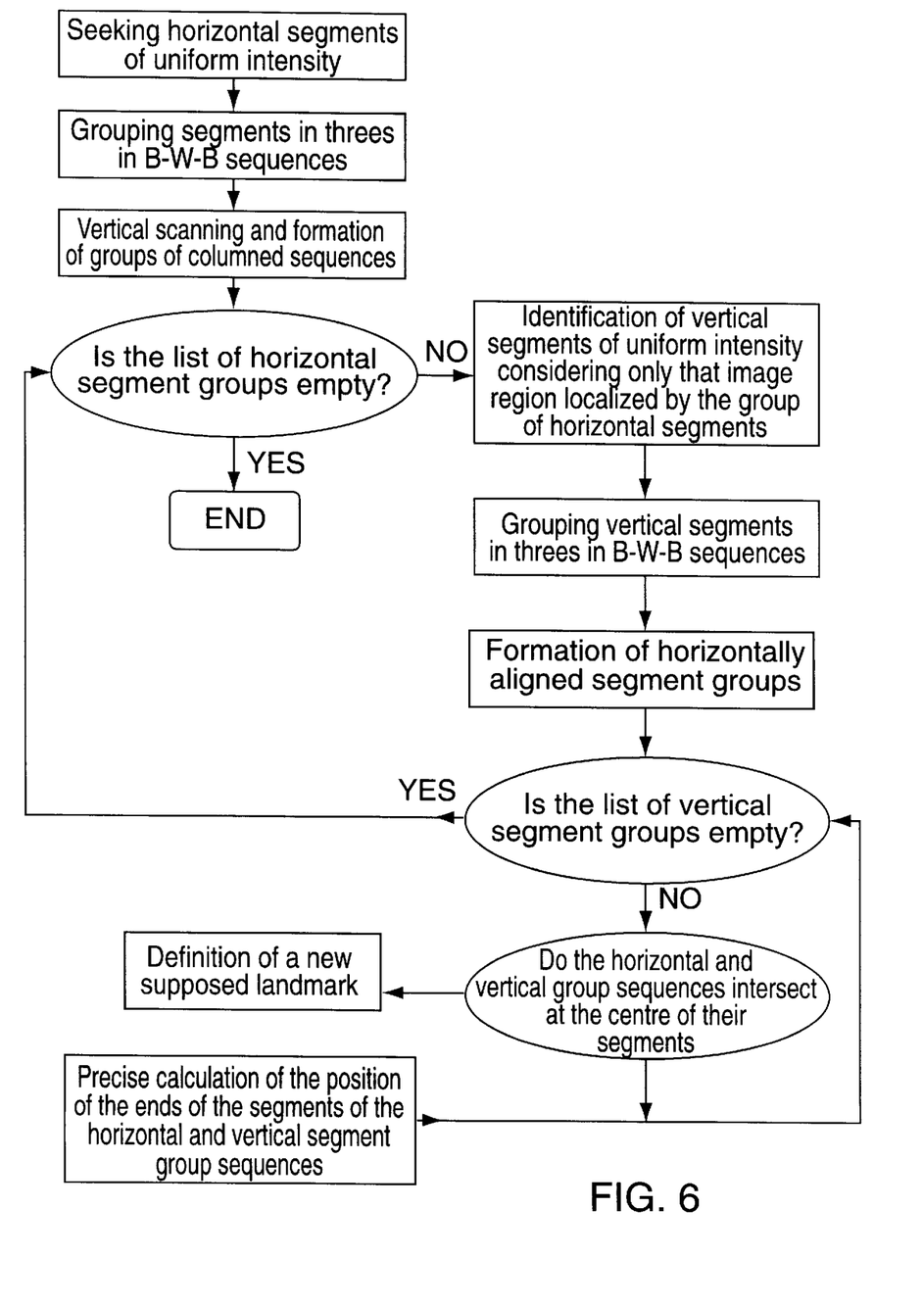
FIG. 6 is a flow diagram schematically showing a procedure for recognizing a landmark in an image according to the present invention.

The flow diagram of FIG. 6 illustrates the detecting procedure of the presence of a landmark within the visual field of the camera. The image is divided into a predefined set of equidistant rows each of which is scanned horizontally in a search for points in which the light intensity undergoes a value change exceeding a given threshold. These points are then considered as the ends of segments along which the light intensity is virtually constant. Each segment in which the intensity increases in moving from the interior of the segment to the outside is considered as black (B) whereas the reverse case is considered as white (W). Each line hence generates sequences of black segments and white segments. The same image is then scanned by vertical columns in the same manner. Again in this case sequences of black segments and white segments are obtained.

By suitably analyzing and reprocessing said segment sequences, the form of the possibly framed landmark can be constructed and compared with each of the possible forms known to the processor. By a first approximated procedure of intersection of the sequences obtained by scanning the image vertically and horizontally, a rough estimate of the significant dimensions of the possibly framed landmark is obtained. A more refined procedure, in which starting with said rough estimate the light intensity gradient in the transition regions from white segment to black segment or vice versa is analyzed, enable the sizes of the two ellipses represented by the image of the landmark circles to be conducted with precision.

With the more refined procedure, in which starting with said rough estimate the light intensity gradient in the transition regions from white segment to black segment or vice versa is analyzed, it is possible to identify with precision a plurality of points belonging to the images of both the circular contours of the landmark. These contour images are a pair of concentric ellipses, whose equations are obtained by fitting the general ellipse equation with said points. Starting from the equation of the outer ellipse and using a mathematical procedure known as perspective inversion, the position and orientation of the landmark relative to the camera is evaluated. Such evaluation is done by calculating in which position the landmark should be, in order for its outer circular contour to produce the acquired image. This corresponds to a hypothetical superimposition of the deformed landmark contour and the acquired image. From a knowledge of how the camera is positioned and oriented relative to the robot, it is hence possible to evaluate the position and orientation of the robot relative to the landmark. The same perspective inversion procedure is the repeated on the inner ellipse by calculating the distance from the optical centre of the camera at which the centre of a circular contour of diameter equal to the outer circular contour of the landmark would have necessarily to lie in order to produce said inner ellipse.

The ratio of the diameter of the outer circle to the diameter of the inner circle of the landmark is then calculated as the ratio of said distance to the distance of the landmark centre from the optical centre as deduced from the previously evaluated position and orientation. This diameter ratio, indicated in the landmark list as a previously known ratio of two corresponding measurements characteristic of the two concentric circular contours of the framed landmark, enables the landmark to be unambiguously identified.

A fundamental requirement of the system is to have calibrated cameras. A very advantageous aspect of the present invention is the manner of calibrating the camera/robot system. In this respect, to be able to obtain geometric information on the position and orientation of the robot vehicle from images acquired by a vision system on board, it is necessary to have initially identified the relationship linking the position relative to the vehicle of a generic point within scene ad its image point. To achieve this, use is made of a sequence of images of a reference object of known characteristics take from different viewing positions. In particular, a known regular rectangular planar lattice formed from a plurality of rows and columns of regular geometric shapes is framed.

Figure 3:
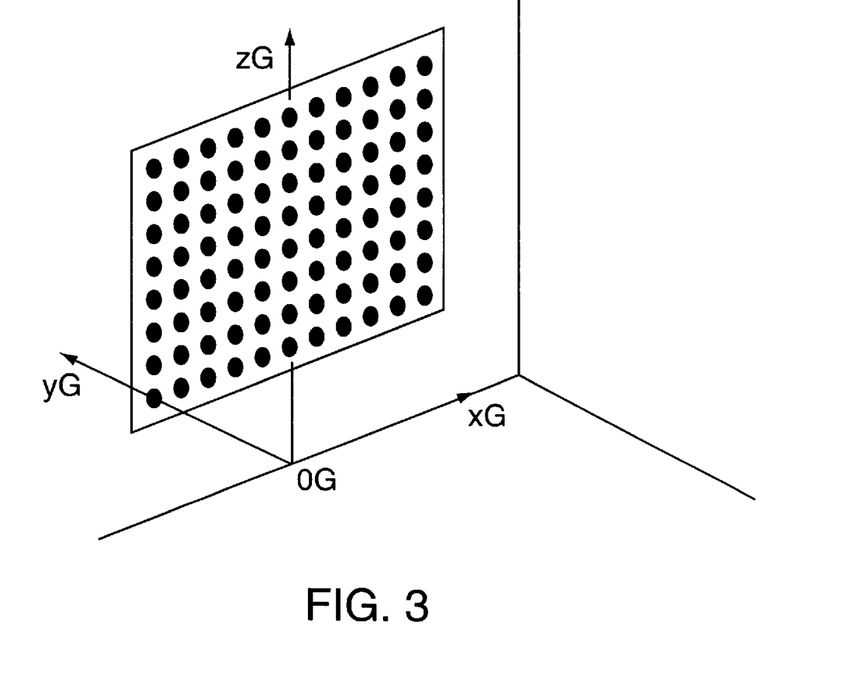
FIG. 3 represents an image used for calibrating the camera of the present invention.

With reference to FIG. 3, for this purpose a regular rectangular planar lattice formed from rows and columns of dark identical dots on a light background is used according to the present invention. It is arranged in a plane perpendicular to the navigation plane, to define a rigidly connected clockwise reference system G having as its axis zG the upwardly directed vertical axis passing through the centres of the dots of the central column and further having as its origin OG the intersection of zG with the navigation plane and as its axis yG the axis parallel to the navigation plane and perpendicular to the lattice plane directed as the exit vector from the viewing point OC and entering the lattice plane perpendicularly. The axis xG is the horizontal and lies in the lattice plane directed towards the right observing the lattice frontally.

The purpose of the calibration procedure is to find the effective geometric relationship between points within the scene and their image points acquired by the vision system and the transformation between this latter and the odometric measurement system. Using the pinhole camera model, an image formation model must first be devised which depends only on a limited number of free parameters for which those values must then be found such that the model deriving from them reproduces as accurately as possible the transformation from three-dimensional points of known position of the current odometric reference system to the corresponding points in the image. The free parameters of the image formation model are those referred to the pinhole camera model: the focal length $\alpha_u$ and $\alpha_v$ expressed in width and height of a pixel: the coordinates $(u_0, v_0)$ of the image centre expressed in pixels, the position of the camera relative to the navigation plane; the height h of the optical centre above the navigation plane; the tilt angle $\theta$ and the swing angle $\psi$. Other parameters link the camera reference system projected onto the navigation plane to the odometric reference system rigidly connected to the vehicle. Finally, there are those parameters which link the initial odometric reference system O with the reference system G rigidly connected to the calibration lattice; excluding this latter parameters relative to the lattice, the values of all the other parameters constitute the result of the calibration procedure and are used as input data, coming from the landmark location procedures.

From the image formation model two mathematical functions are defined giving the position in pixels of the centre of a given dot within the image taken by the robot vehicle in a certain position and orientation O with respect to the initial odometric reference system, the dot having known coordinates expressed in the lattice reference system, as a function of the model free parameter vector.

The calibration procedure is divided into three steps: initial image acquisition from various positions, measurement of the centres of the dots visible in the given images, followed by their processing to find the free parameters of the image formation model.

Figure 7A:
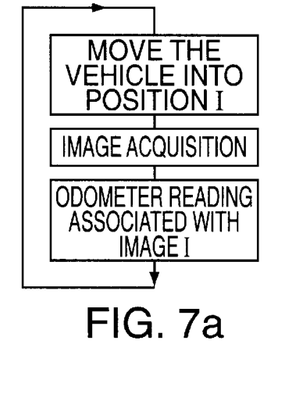
FIGS. 7a–7c are flow diagrams schematically showing the steps involved in calibrating a camera according to the present invention.
Figure 7B:
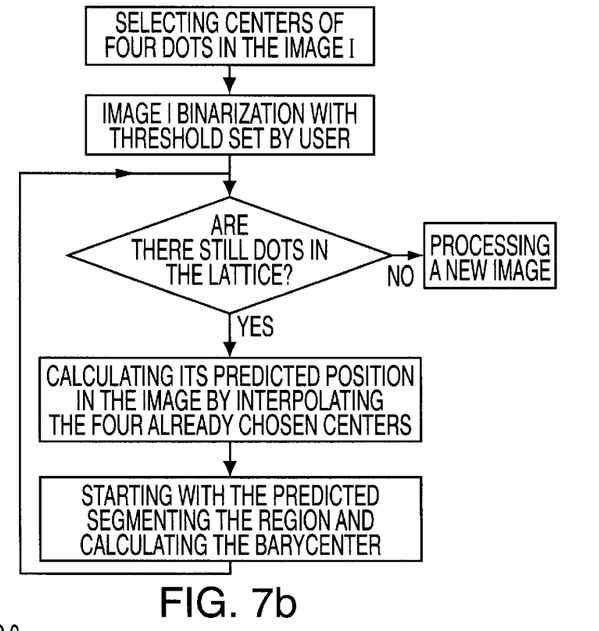

In the first step as shown in FIG. 7a, i.e. image acquisition, use is made of a predefined list of a given number of positions and orientations which the robot must sequentially reach in order to acquire afterwards in each case an image of its calibration lattice, which is stored in the image list for the second part of the calibration procedure. Associated with each acquired image, the position and orientation of the robot estimated by the odometric system within a reference system which does not vary during the procedure is stored. In the second step shown in FIG. 7b the user considers all the images of the image list prepared during the first step. In each of these he selects four dots, three of which are not in alignment. The transformation from points of the lattice to corresponding points of the image is a transformation between two projecting planes, so that it is possible to interpolate the positions of the centres of the four selected dots to also estimate the centres of the other lattice dots on the image. The image is binarized, i.e. the grey level of each pixel is set to the maximum or minimum value possible according to whether it is greater or less than a certain threshold set by the user. For each lattice dot a procedure is then performed for measuring the position of its centre within the image. Use is made here of the fact that the pixels of a dot image are all at the same value by the effect of the binarization, as the lattice dots are dark on a clear background. The maximum connected region having the maximum grey level formed from pixels and containing that pixel which the preceding interpolation indicated as the dot centre is then identified. The new measurement of the centre position is then calculated as the position of the barycentre of the region surrounded by the pixels.

Figure 7C:
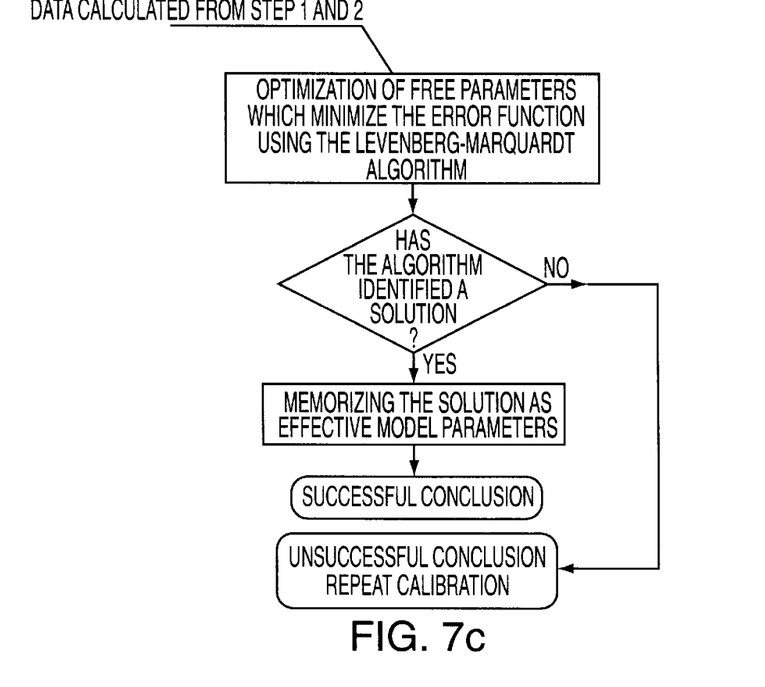

In the third calibration step as shown in FIG. 7,6 the predicted position of the centres of the framed dots in the various images is calculated on the basis of the free parameters of the image formation model to hence construct an error function which is the sum of squares of the distances of the positions of the dot centre on the image measured from their positions as predicted by the image formation model when the vehicle is in the corresponding position and orientation specified in the position list for image taking.

The free parameter values which minimize this error function are those which best fit real images.

It should be noted that according to the present invention, the robot in order to correctly identify its position needs to frame only one landmark, and not at least three as in the state of the art. This means that the navigation system is less invasive of the environment, is of lower cost and requires less maintenance. During the framing procedure it may happen that the robot has accumulated such a quantity of position errors that it is unable to find any landmark within the expected field of vision. In this case provision is made to rotate the camera in a horizontal plane. This facility increases the reliability of the entire robot, and allows it to be virtually perfectly oriented under all conditions within the environment in which it moves. For improved handling and control, the robot further comprises an interactive terminal. Said interactive terminal comprises an alphanumerical display and a keyboard.

We claim:

1. A navigation system for an autonomous mobile robot within an environment which comprises a plurality of coded signs at predetermined points, said signs being geometric entities composed of one outer and one inner concentric circles, each of these two circles having a characteristic dimension which is the diameter of said circles, said system comprising means for storing data regarding said environment, means for the image acquisition and automatic recognition of said coded signs, a computer for estimating its own position and orientation relative to one of said coded signs and to the environment, means for acquiring the location of target positions, means for planning a path to be covered within said environment to reach target positions, and comprising means for controlling the robot movement starting with path data generated by said path planning means wherein said acquisition means are based on a passive vision system with standard CCD cameras without requiring any particular illumination.

2. A navigation system as claimed in claim 1, wherein the ratio of the two diameters of the two concentric circles is variable, the diameter of the outer circle remaining constant.

3. A navigation system as claimed in claim 1, wherein said passive vision system is composed of a camera mounted rigidly on the body of the robot.

4. A navigation system as claimed in claim 3, wherein said camera is a black/white CCD camera generating a standard CCIR video signal.

5. A navigation system as claimed in claim 1, wherein said computer for estimating the position and orientation of the robot with respect to a coded sign uses perspective inversion of an ellipse equation which comes from recording said coded sign executed by said passive vision system.

6. A navigation system as claimed in claim 1, wherein said image acquisition means comprise a microcomputer, a system memory for said navigation system, a system bus for said navigation system with communication devices, and an image acquisition card connected to the microcomputer via the system bus, said card sampling a black/white standard CCIR video signal and storing the sampled signal in a memory bank in the form of an image matrix.

7. A navigation system as claimed in claim 1, wherein said robot further comprises an interactive terminal.

8. A navigation system as claimed in claim 7, wherein said interactive terminal is composed of an alphanumerical display and a keyboard.

9. A robot provided with the navigation system of claim 1, for which an installation procedure is provided consisting of the following steps:
   a) calibration of the robot/camera system;
   b) acquisition and relative storage of data regarding the environment within which the path is to be covered; after which, when positioned in proximity to a coded sign,
   c) the user provides the robot with the target position to be reached, or the end-of-mission command;
   d) the robot plans the path to be taken starting from the target position to be reached and the data regarding the environment by dividing the path into successive points to be reached;
   e) moving the robot by said movement control means to the next point of the planned path;
   f) framing a coded sign by said passive vision system;
   g) recognition of the coded sign;
   h) estimation of the robot's position and orientation relative to said coded sign;
   i) calculating the robot's position and orientation relative to the environment starting with the position and orientation relative to the coded sign;
   j) controlled movement by said movement control means to the next point on the planned path starting from the position calculated under step i;
   k) repetition of steps e, f, g, h, i and j until completion of the planned points on the path;
   j) repetition of point c, until issuance of an end-of-mission command.

10. A robot as claimed in claim 9, wherein the calibration of step a) comprises the following steps:
   an initial image acquisition by framing from various positions a known regular rectangular planer lattice formed from a plurality of rows and columns of regular geometric shapes, which are dark identical dots on a light background,
   storing the robot position and orientation estimated by an automatic system within an invariant reference system,
   measuring the positions of the centres of the figures visible in data images,
   processing said positions and said robot position and orientation to find free parameters of an image formation model.

11. A navigation system for an autonomous mobile robot within an environment which comprises coded signs at predetermined points, said signs being geometric entities composed of one outer and one inner concentric circles, each of these two circles having a characteristic dimension which is the diameter of said circles, said inner concentric circle having an central region which is white and the circular ring between said inner and outer concentric rings being of a dark color, said system comprising means for storing data regarding said environment, means for the image acquisition and automatic recognition of said coded signs, a computer for estimating its own position and orientation relative to one of said coded signs and to the environment, means for acquiring the location of target positions, means for planning a path to be covered within said environment to reach target positions, and comprising means for controlling the robot movement starting with path data generated by said path planning means wherein said acquisition means are based on a passive vision system with standard CCD cameras without requiring any particular illumination.

12. A navigation system for an autonomous mobile robot within an environment as defined in claim 11 wherein the dark color between the concentric circles is black.

* * * * *